June 5, 1956　　　　　E. W. LARSEN　　　　　2,749,419
MACHINE FOR WELDING CONTACTS ONTO SWITCH PARTS
Filed April 7, 1953　　　　　　　　　　　　11 Sheets-Sheet 6

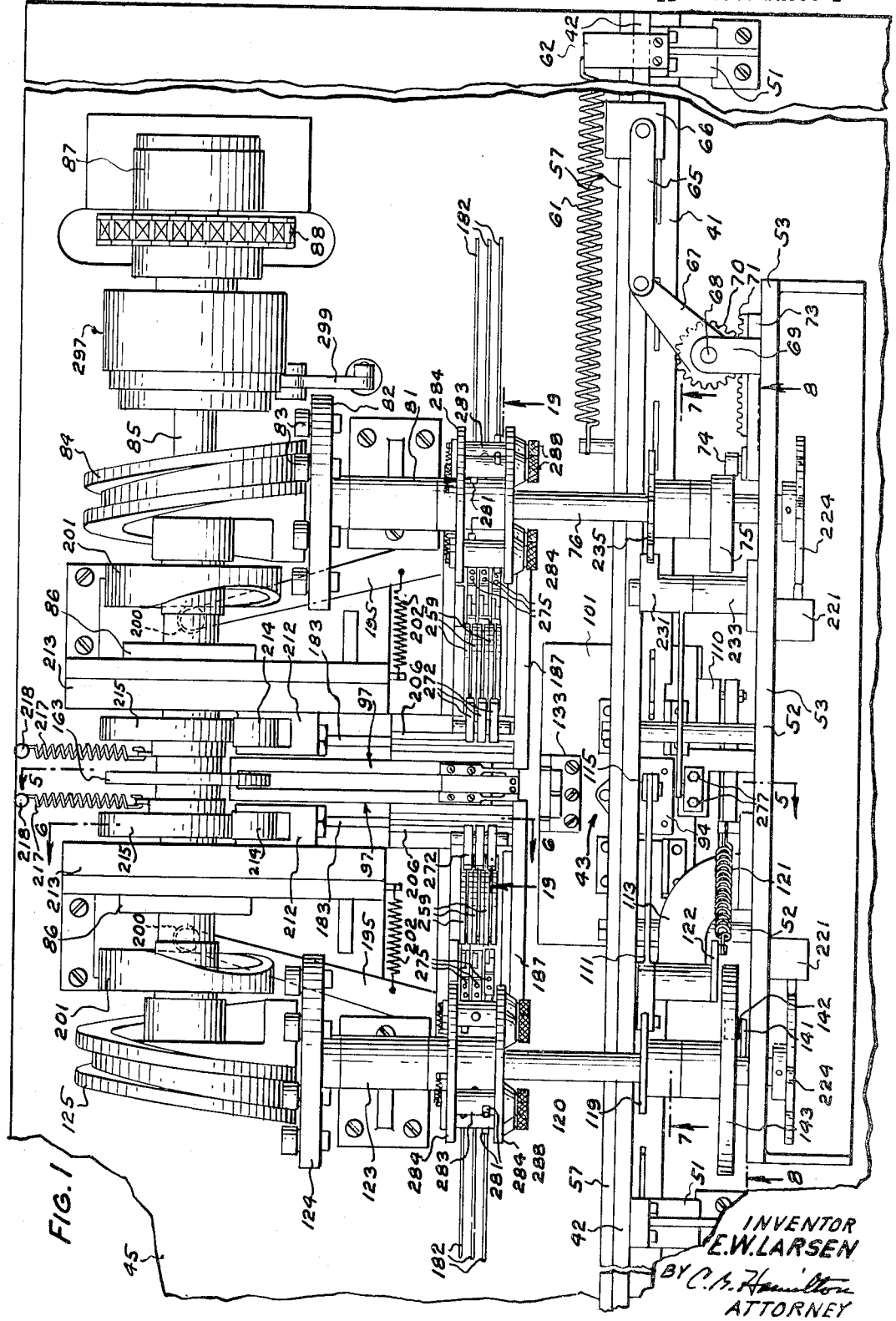

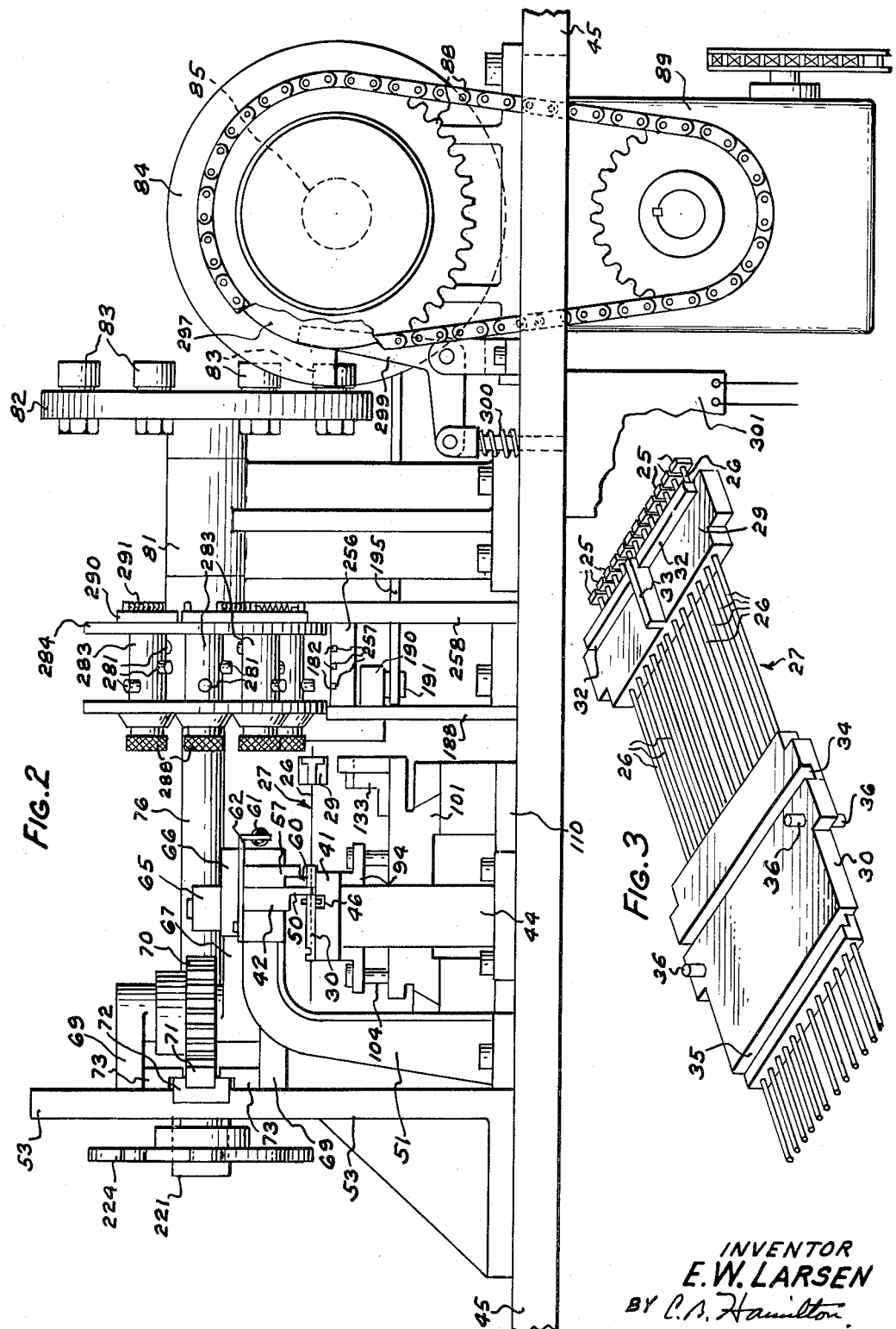

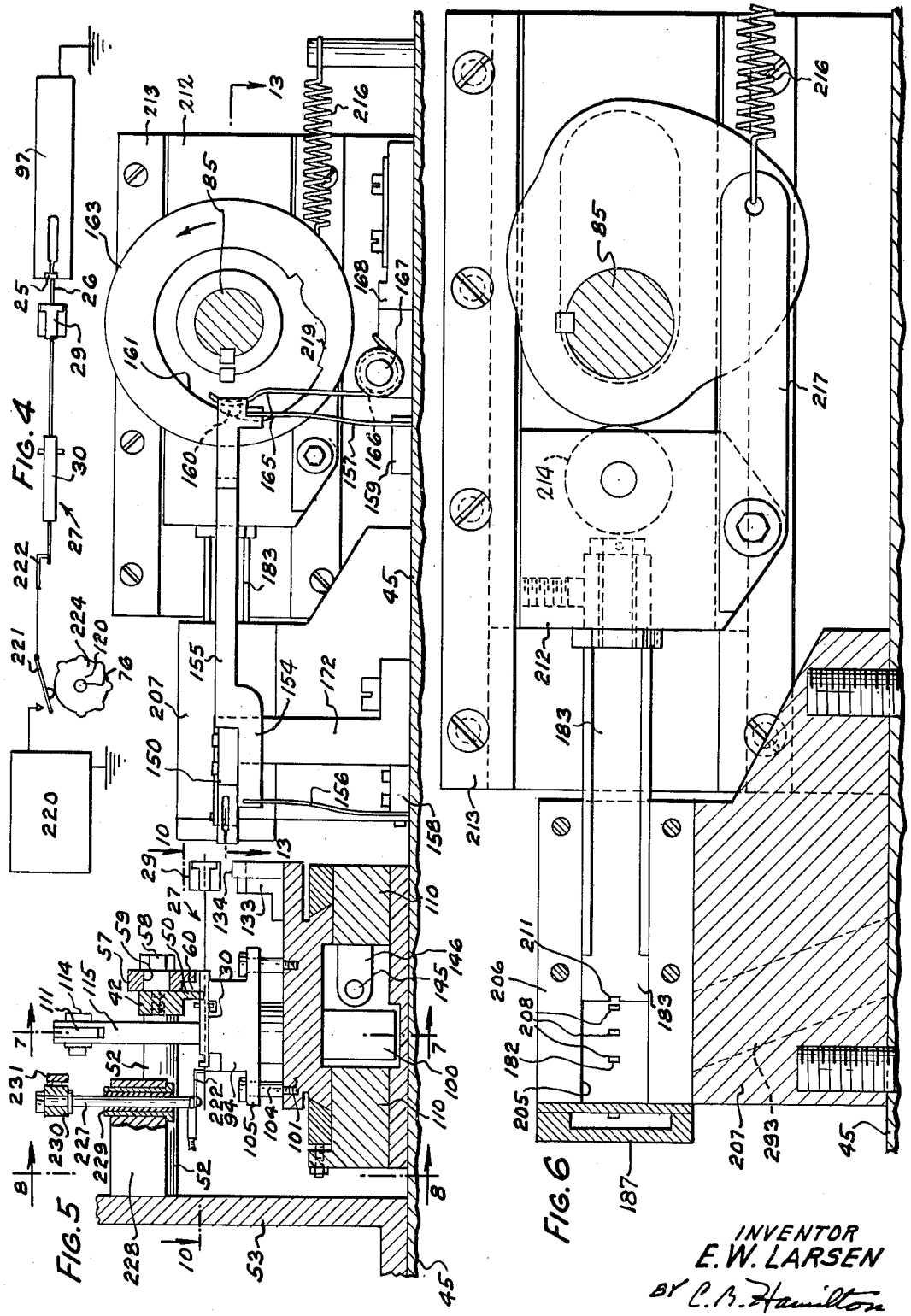

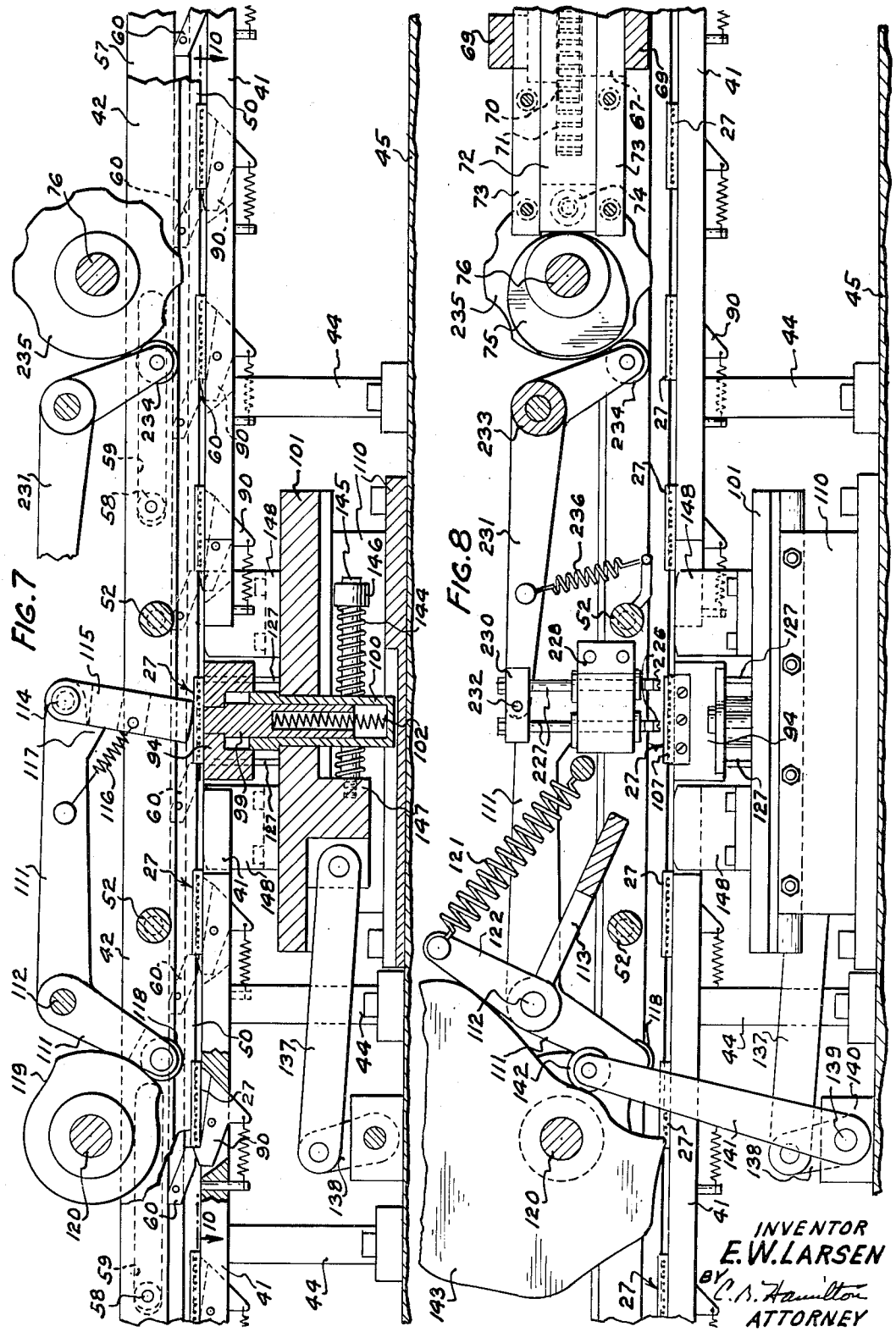

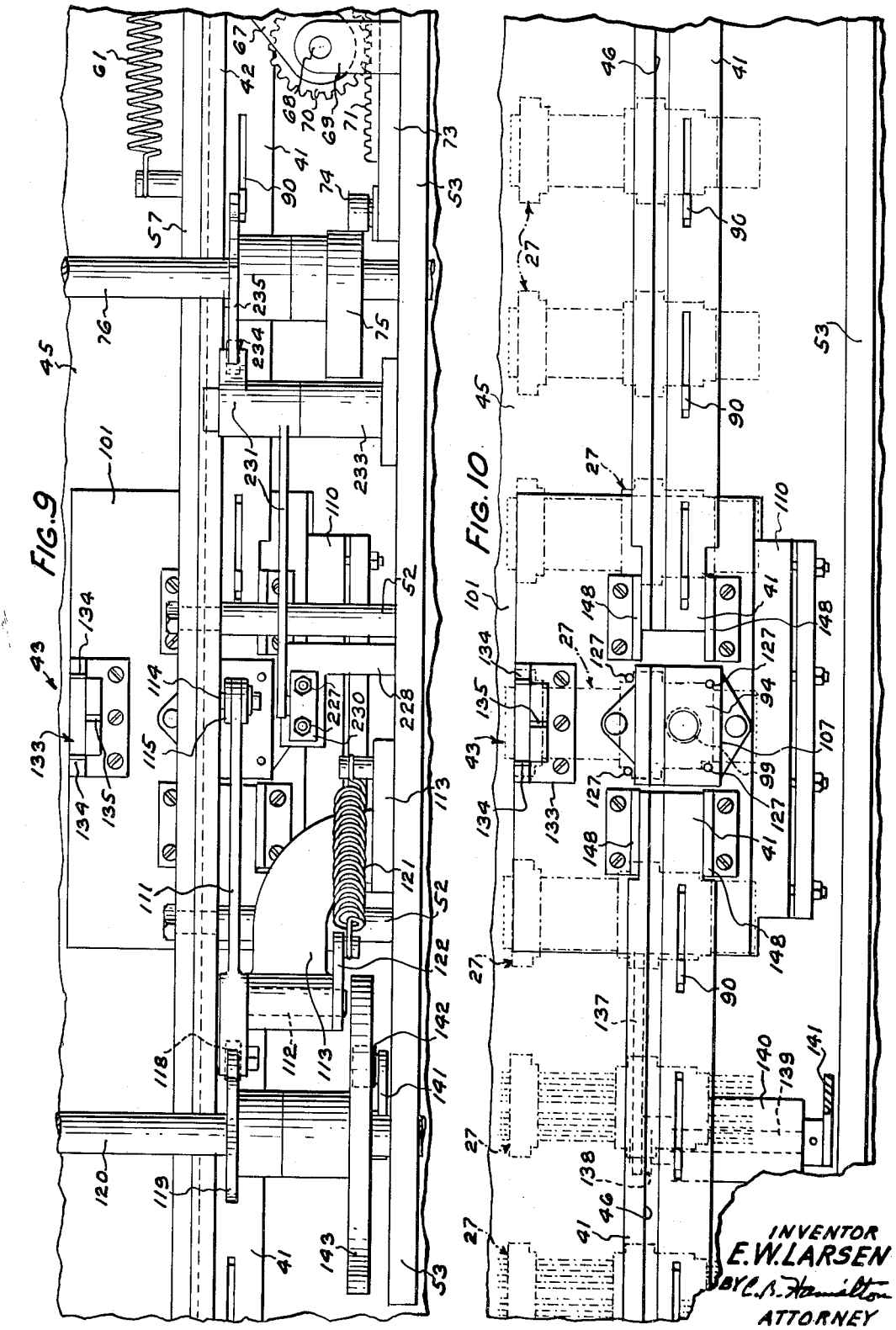

INVENTOR
E. W. LARSEN
BY C. B. Hamilton
ATTORNEY

June 5, 1956  E. W. LARSEN  2,749,419
MACHINE FOR WELDING CONTACTS ONTO SWITCH PARTS
Filed April 7, 1953  11 Sheets-Sheet 7

INVENTOR
E. W. LARSEN
BY C. B. Hamilton
ATTORNEY

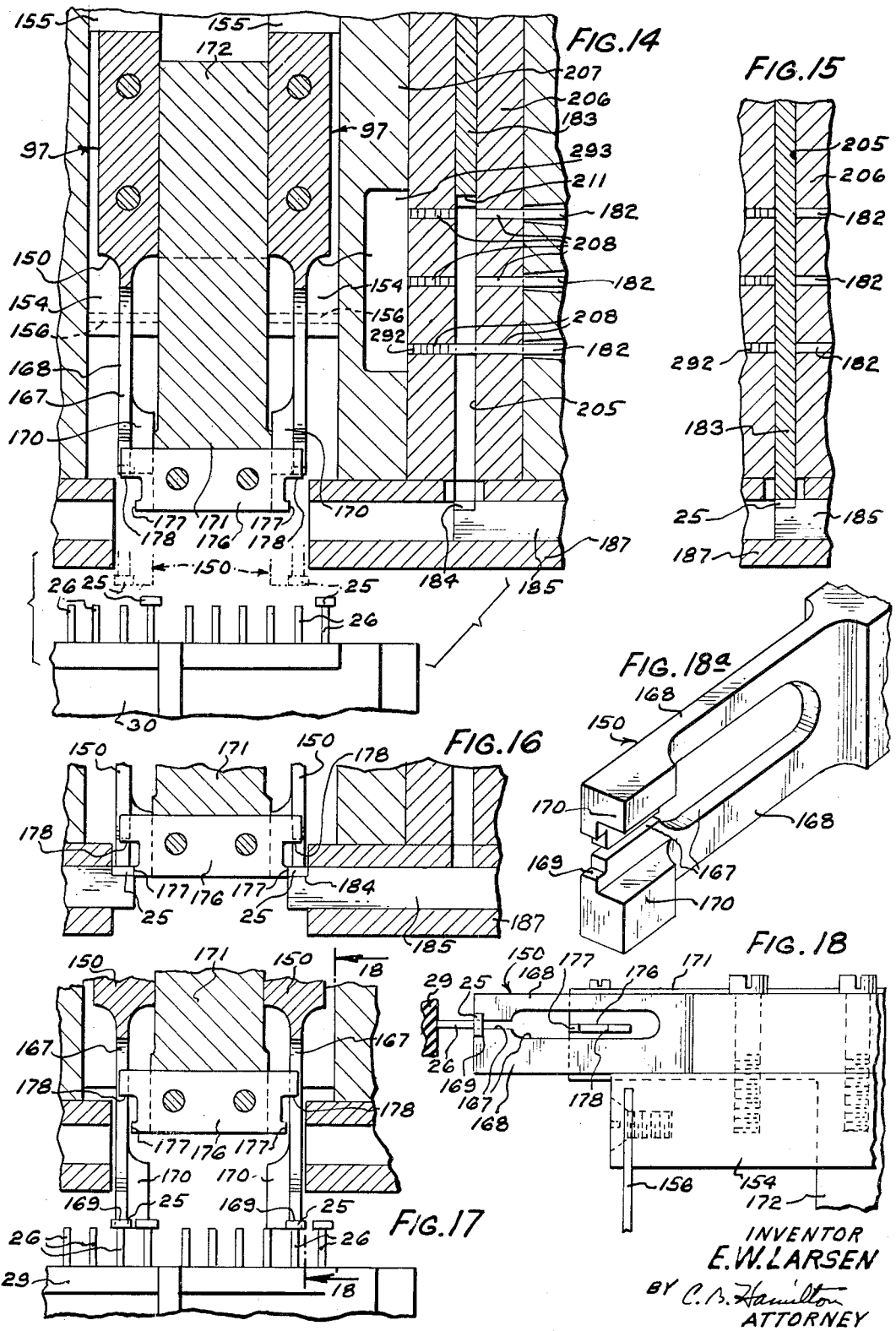

June 5, 1956    E. W. LARSEN    2,749,419
MACHINE FOR WELDING CONTACTS ONTO SWITCH PARTS
Filed April 7, 1953    11 Sheets-Sheet 9
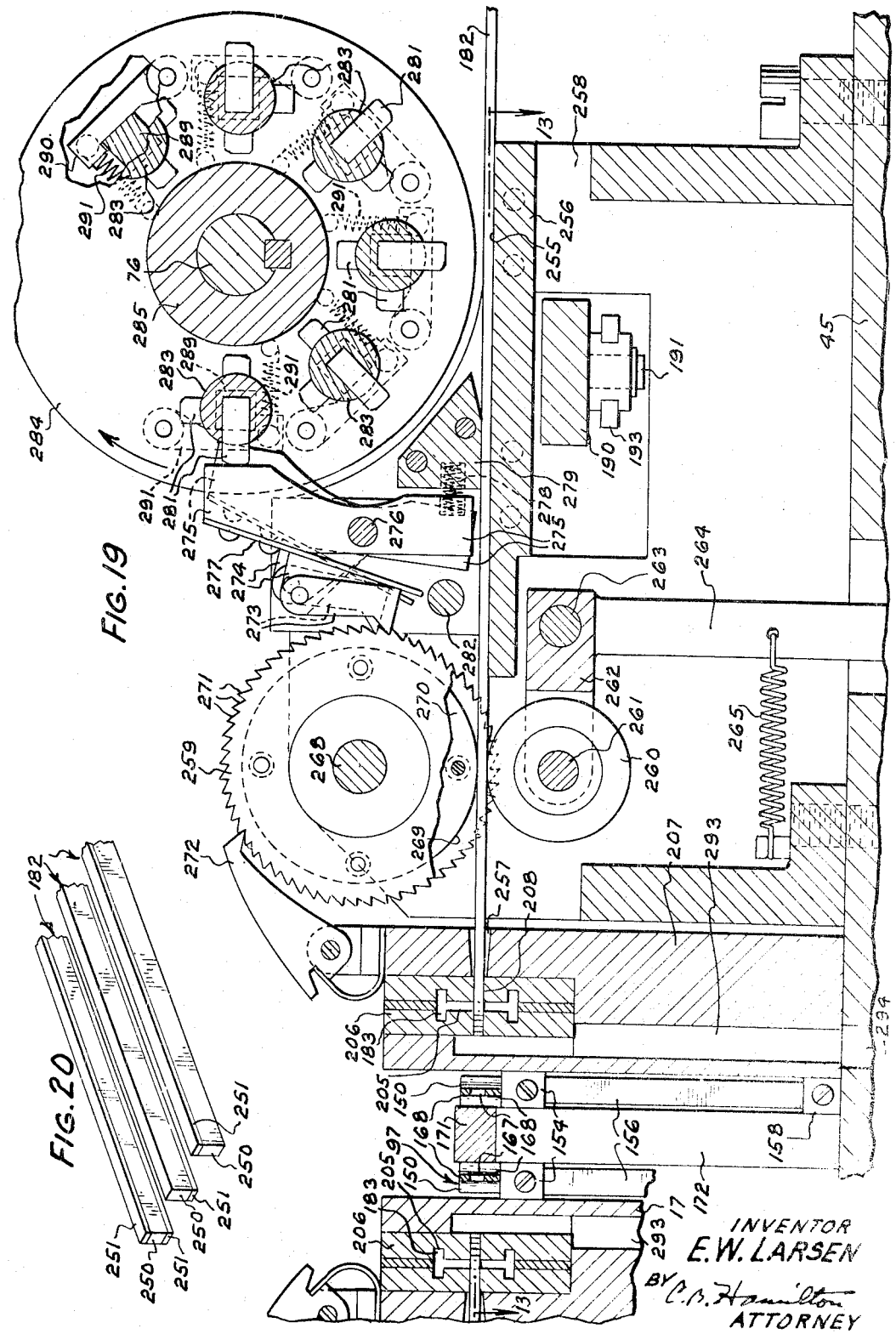
INVENTOR
E. W. LARSEN
BY C. B. Hamilton
ATTORNEY

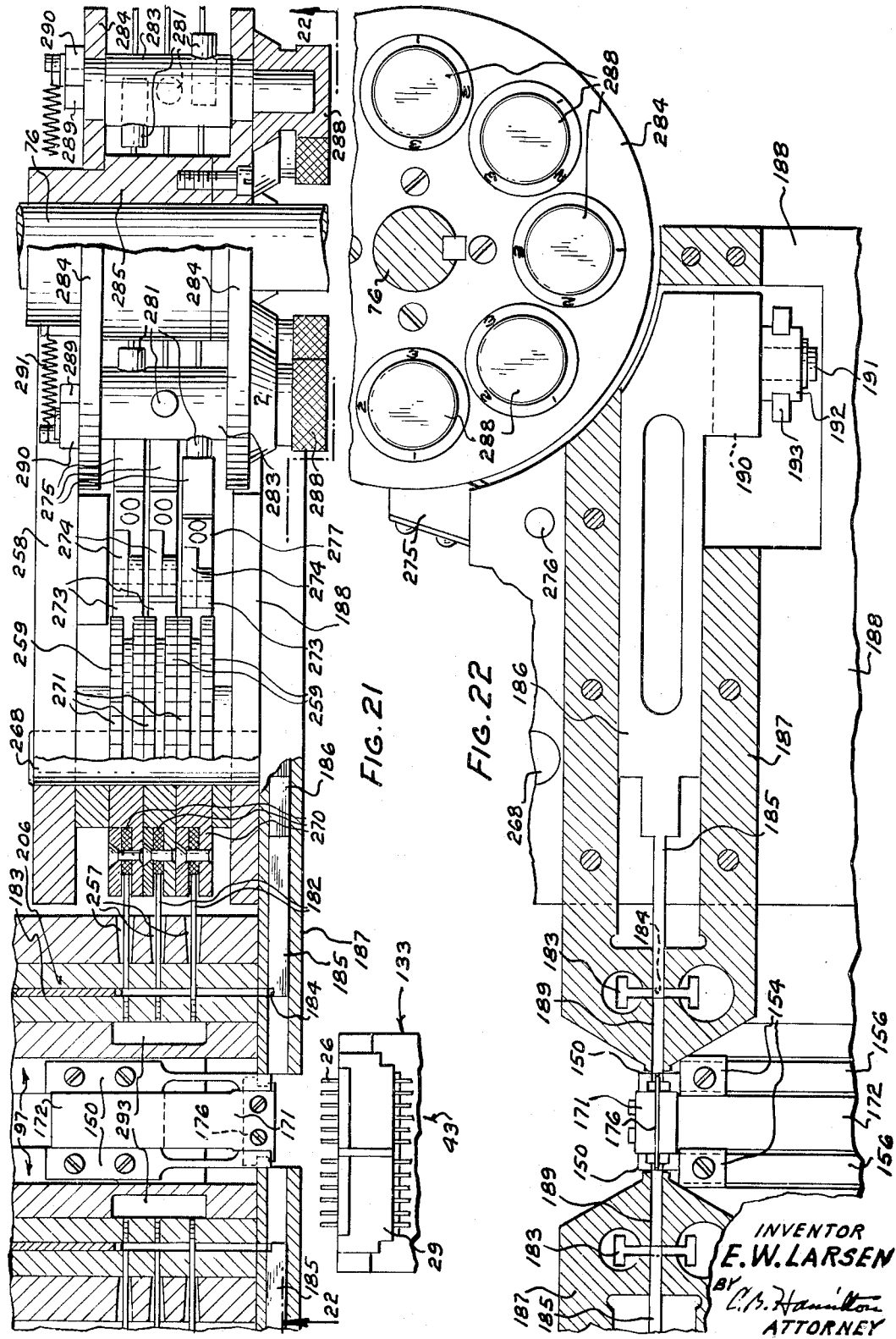

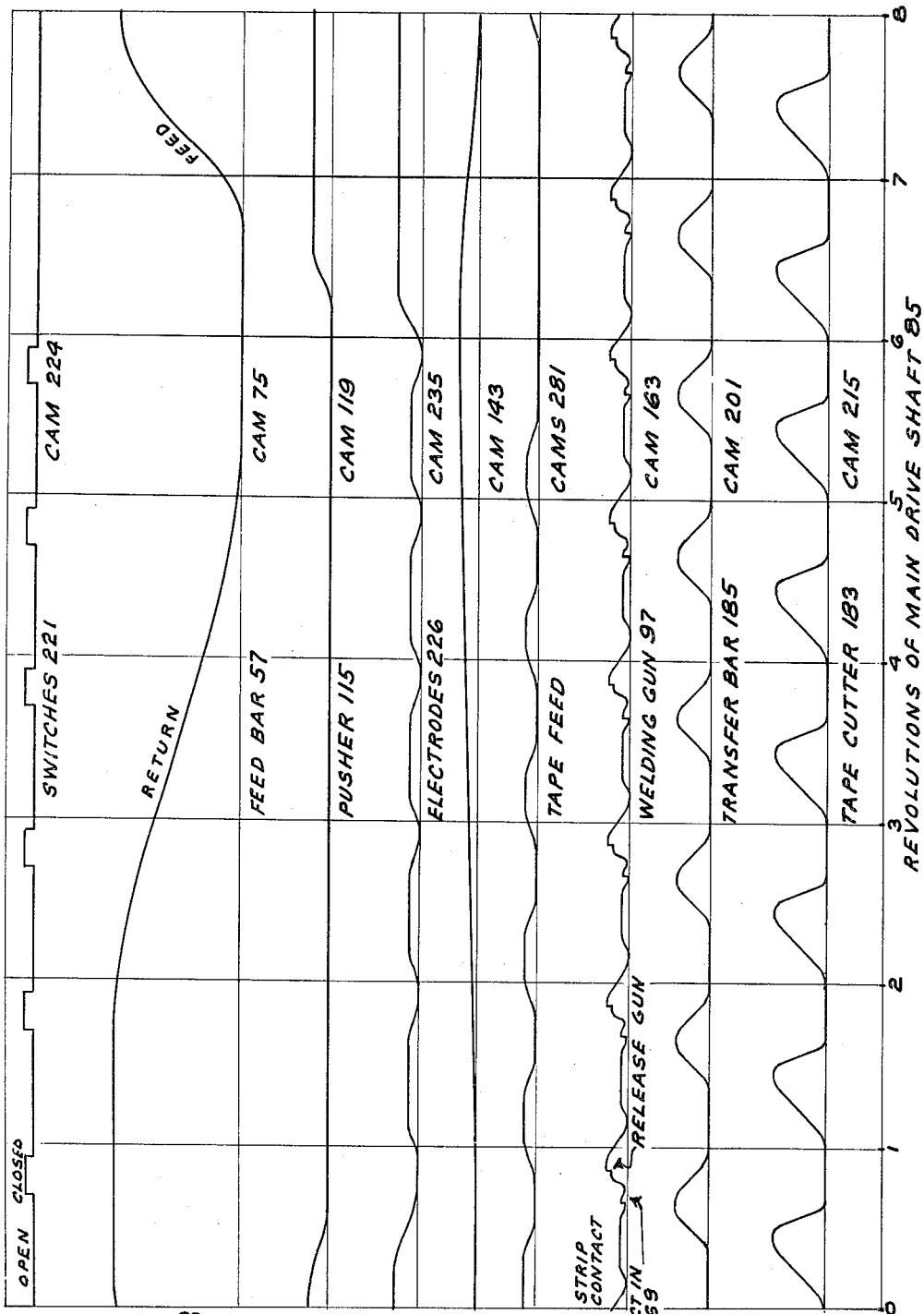

United States Patent Office 2,749,419
Patented June 5, 1956

2,749,419

MACHINE FOR WELDING CONTACTS ONTO SWITCH PARTS

Einer W. Larsen, Elmhurst, Ill., assignor to Western Electric Company, Incorporated, New York, N. Y., a corporation of New York Application April 7, 1953, Serial No. 347,335

14 Claims. (Cl. 219—4)

This invention relates to welding apparatus for welding contacts onto parts and more particularly to a percussion welding machine for successively welding a plurality of contacts onto the ends of a series of wires of an electrical relay component.

It is an object of the present invention to provide an improved welding apparatus for welding contacts onto parts.

It is a further object of this invention to provide an improved apparatus for forming contacts and welding them onto the ends of a plurality of wires of a relay part.

Another object of the invention is to provide mechanism for selectively forming contacts of various types and feeding them to a welding head of the apparatus.

In accordance with one embodiment of the invention as applied to the welding of contacts onto the ends of a plurality of wires of a relay component in which the wires are arranged laterally in a row in two groups with the wires in each group spaced apart a uniform distance and molded in a pair of blocks of plastic material, mechanism is provided for supporting the relay component at a welding station with one of the wires of each group in alignment with one of a pair of welding heads which are adapted to receive contacts therein and to be propelled toward the relay component to thrust the contacts into engagement with the ends of the pair of wires and thereby complete circuits to a pair of current generating devices for supplying welding current to effect the welding of the contacts onto the ends of the wires, and after each welding operation the mechanism advances the relay component to align successive wires in each of the groups with the welding heads for the successive welding of contacts onto all of the wires on the relay component, mechanism also being provided for selectively advancing different types of contact tapes, shearing contacts therefrom, and feeding the contacts into the welding heads.

Other objects and advantages of the invention will become apparent by reference to the following detailed description and the accompanying drawings illustrating a preferred embodiment of the invention, in which Fig. 1 is a plan view of the welding apparatus with the portions thereof broken away;

Fig. 2 is an end elevational view of the apparatus as looking from the right as viewed in Fig. 1;

Fig. 3 is a view in perspective of the switch part showing the contacts welded onto the wires thereof;

Fig. 4 is a diagrammatic view of the welding circuit;

Fig. 5 is a vertical cross-sectional view taken on the line 5—5 of Fig. 1;

Fig. 6 is an enlarged vertical cross-sectional view taken on the line 6—6 of Fig. 1;

Figure 12:
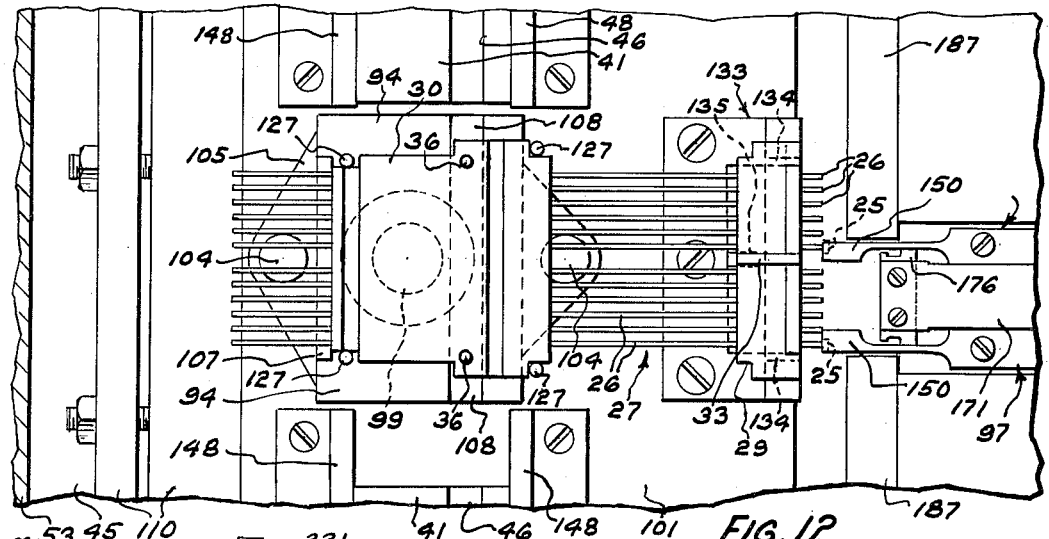
Figure 11:
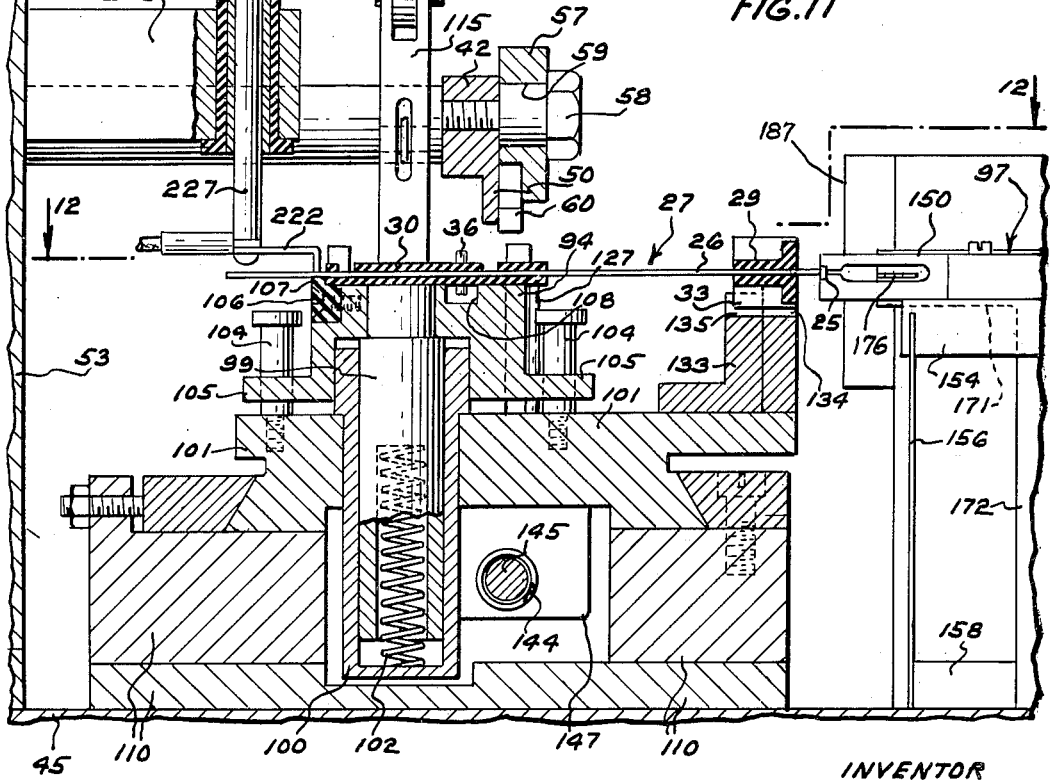
Figure 13:
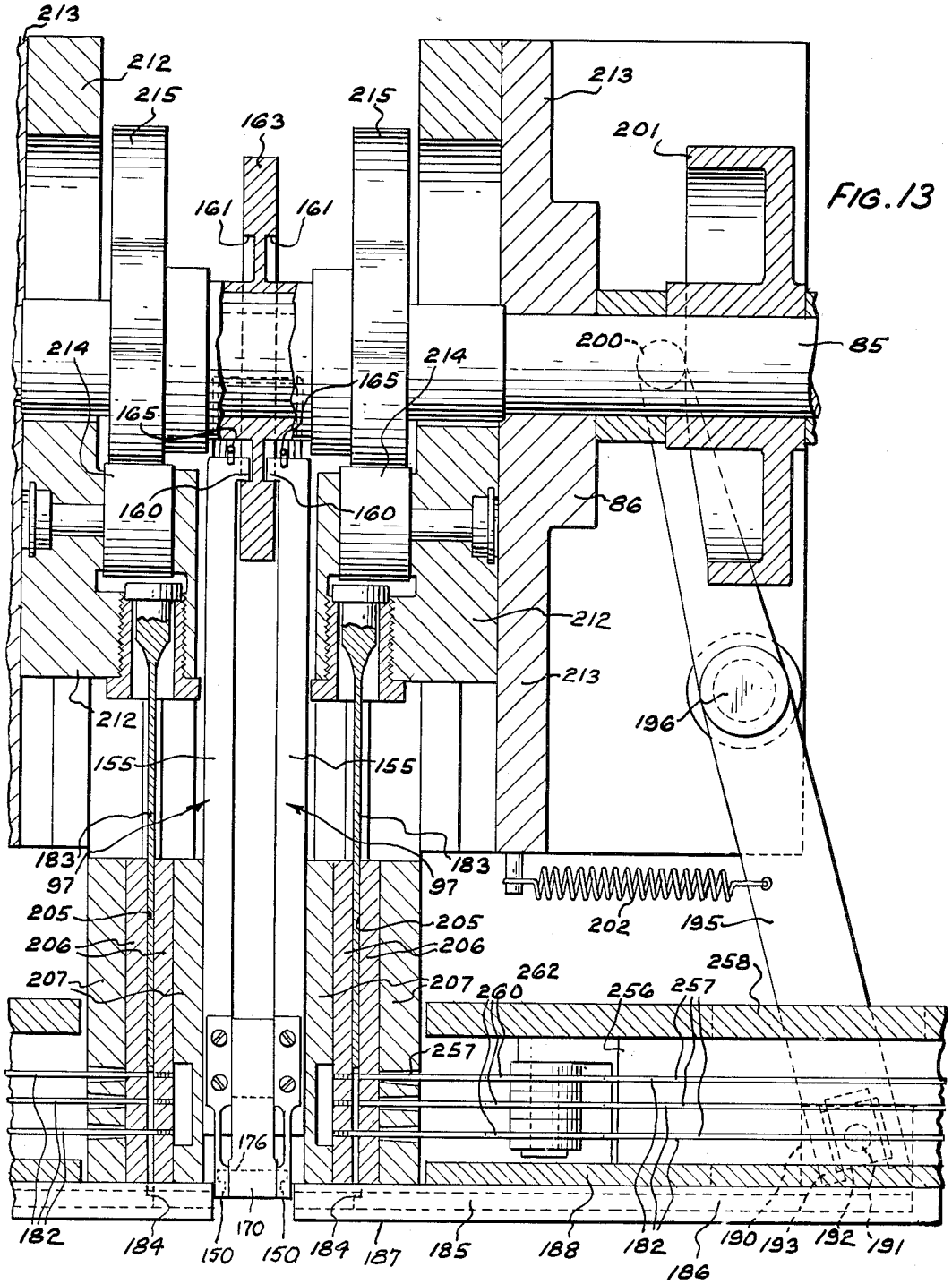

Figs. 7 and 8 are longitudinal vertical sectional views of a portion of the apparatus taken on the lines 7—7 and 8—8, respectively, of Figs. 1 and 5;

Fig. 9 is an enlarged plan view of a portion of the apparatus shown in Fig. 1;

Fig. 10 is a plan sectional view of a portion of the apparatus taken on the line 10—10 of Fig. 5;

Fig. 11 is an enlarged vertical cross-sectional view showing the left-hand portion of the apparatus shown in Fig. 5 with parts thereof in changed position;

Fig. 12 is a fragmentary plan view of a portion of the mechanism indicated by the line 12—12 of Fig. 11;

Fig. 13 is a plan sectional view taken on the line 13—13 of Figs. 5 and 19;

Figs. 14, 15, 16 and 17 are enlarged plan sectional views of portions of the apparatus showing the mechanism for shearing contacts from contact tapes, loading the contacts into the welding guns, and advancing the welding guns and the contacts into engagement with the ends of the wires on the switch part;

Fig. 18 is a vertical sectional view taken on the line 18—18 of Fig. 17;

Fig. 18-a is an enlarged fragmentary perspective view of a portion of a welding gun;

Fig. 19 is a vertical longitudinal sectional view taken on the line 19—19 of Fig. 1;

Fig. 20 is a view in perspective of three different composite contact tapes;

Fig. 21 is a fragmentary plan sectional view of a portion of the apparatus showing the mechanism for selectively feeding one of the contact tapes and the parts associated therewith;

Fig. 22 is a vertical sectional view taken on the line 22—22 of Fig. 21; and

Fig. 23 is a cam shaft of several of the actuating elements of the apparatus.

The present apparatus is designed to weld a series of contacts 25 onto the ends of a plurality of wires 26 of a component 27 of an electrical relay which shall hereinafter be referred to as the relay part 27. The wires 26 are molded into a pair of blocks 29 and 30 of plastic insulating material, with the wires 26 arranged laterally in a row in two groups of six wires in each group, and with the wires in each group spaced apart a uniform distance, and with the adjacent wires of the two groups separated from each other a distance greater than that of the wires in each group. The block 29 has a pair of opposed ribs 32—32 extending along the forward edge thereof on the upper and lower surfaces and a pair of centrally disposed ribs 33—33 on opposite sides thereof extending parallel with the wires 26. A pair of grooves 34 and 35 is formed on the block 30. The end portions of the wires extend beyond the blocks 29 and 30 and the ends of the wires are arranged in a straight line.

The relay parts 27 are adapted to be fed into a welding apparatus 40 (Fig. 1) by being placed onto a guide bar or track 41 (Figs. 1, 2, 7, 9 and 10) and into a guideway formed by the lower guide bar 41 and an upper guide bar 42 and the parts 27 are intermittenly advanced to the right as viewed in Fig. 1 into a welding station 43 located centrally of the apparatus. The relay parts 27 may be applied to the guide bar 41 manually or by any suitable automatic feed mechanism. The lower guide bar 41 is supported on posts 44 (Figs. 2 and 7) mounted on a base plate 45, which is supported by suitable frame members or legs and forms a table top for supporting the various parts of the welding apparatus. A groove 46 is provided in the upper part of the guide bar 41 for receiving the aligning pins 36 on the relay parts 27 and the upper surface of the lower guide bar 41 is adapted to engage the block 30 of the relay parts to support the parts 27 for longitudinal movement. The upper guide bar 42 has a flange 50 (Fig. 2) adapted to enter the groove 34 of the block 30 to prevent the lateral and vertical displacement of the relay parts 27. Brackets 51 (Figs. 1 and 2) mounted on the plate 45 are provided for supporting portions of the upper guide bar 42, other portions of which are supported by rods or studs 52 (Figs. 1, 5, and 7) fixed to and extending horizontally from a vertical plate 53 of an L-shaped bracket or frame member fixed to the base plate 45.

A reciprocable feed bar 57 (Figs. 1, 2, 5, 7, and 9) is supported by a plurality of studs 58 (Figs. 5, 7, and 11) extending through longitudinal slots 59 in the feed bar and secured to the upper guide bar 42. Mounted for movement adjacent the guide bar 42 the feed bar 57 is provided at spaced intervals along the lower portion thereof with a plurality of feed pawls 60 (Figs. 2, 5, 7, and 11) pivotally mounted thereto and adapted to engage the edge portion of the blocks 30 of the relay parts 27 to intermittently advance the parts 27 in response to reciprocation of the feed bar. A spring 61 (Figs. 1 and 2) connected at one end to a fixed member 62 and at its other end to the feed bar 57, stresses the bar for movement to the right as viewed in Fig. 1.

Mechanism is provided for reciprocating the feed bar 57 comprising a link 65 (Figs. 1, 2, and 9), connected at one end thereof through a bracket 66 to the feed bar 57 and connected at the other end to one end of a lever 67 which is fixed to a shaft 68. The shaft 68 is mounted for oscillation in bearing brackets 69 fixed to the vertical plate 53, and the shaft 68 has a gear 70 fixed thereto, which meshes with a rack bar 71 mounted on a slide 72. The slide 72 is guided for movement in guide members 73 on the vertical plate 53 and carries a cam roller 74 which is urged into engagement with a cam 75 on a cam shaft 76.

At opposite ends thereof the cam shaft 76 is journalled in the plate 53 and a bearing bracket 81 mounted on the base plate 45 and the shaft 76 has secured thereto a disc 82, which is provided with a series of eight equally spaced rollers or cam followers 83 arranged in a circle about the axis of the shaft 76. Successive ones of the rollers 83 are adapted to be engaged in the helical cam groove of a cam 84 fixed to a main cam shaft 85 supported in bearings 86, 86 and 87 mounted on the base plate 45. The main cam shaft 85 is driven through a sprocket and chain connection 88 (Figs. 1 and 2) and a speed reducer unit 89 from a suitable motor drive (not shown) and the cam 84 serves to impart uniform angular movement to the shaft 76 through ⅛th of a revolution for each revolution of the shaft 85. Thus, in response to 8 revolutions of the main cam shaft 85, the shaft 76 is rotated through one revolution to effect the reciprocation of the feed bar 57 and to cause the feed pawl 60 to advance the parts 27 engaged by the pawls 60 through one increment of movement, whereby one of the relay parts 27 is removed from the welding station 43 and another relay part is moved into the welding station. The lower guide bar 41 is provided with a plurality of pivoted holding pawls 90 (Figs. 7 and 10), which engage the relay parts 27 and serve to prevent their rearward displacement during the return stroke of the feed bar 57.

The intermediate portion of the lower guide bar 41 in the vicinity of the welding station 43 is interrupted to provide clearance for a seat or platform 94 in the form of a block (Figs. 7, 10 and 11) forming a component of a holder for supporting the relay part 27 during the welding of the contacts 25 thereto. In response to the reciprocation of the feed bar, a relay part 27 is moved onto the platform 94 with the first wire 26 of each of the two groups of wires thereof in vertical planes passing through a pair of welding guns 97 (Figs. 13, 14 and 17), which are adapted to support contacts 25 fed thereinto by suitable contact feeding mechanism and which are adapted to be rapidly advanced into engagement with the ends of the wires after the relay 27 has been lowered to a position with the wires 26 in horizontal alignment with the contacts in the welding guns 97. The relay parts 27 thus are advanced into the welding station 43 with the wires thereof at an elevation above the contacts 25 in the welding guns 97, and mechanism is provided for supporting the platform 94 and the relay part 27 thereon for vertical movement and for moving the platform 94 and the relay part 27 from its normal upper position shown in Figs. 5, 7 and 8 to its lower position shown in Fig. 11.

The platform 94 has a central plunger 99 (Figs. 7 and 11) extending downwardly therefrom and slidably mounted in the bore of a tubular member 100 secured to a slide 101. A spring 102 within the tubular member 100 stresses the platform 94 for movement upwardly to its normal upper position and heads 103 on a pair of vertical studs 104 (Figs. 5 and 11), secured to the slide 101 and passing through apertured flanges 105 on the platform 94, serve to limit the upward movement thereof. A block of insulating material 106 is secured to the platform 94 and has a ledge 107 extending upwardly from the upper surface of the platform 94 at the rear portion thereof to engage the rear edge portion of the block 30 of the relay part 27 to support the relay part 27 against movement during the impact of the welding guns against the wires 26. A groove 108 in the platform 94 forms a continuation of the groove 46 in the lower guide bar 41 for the reception of pins 36 of the relay parts 27. The slide 101 has a lower dove-tail portion thereon, which is supported for sliding movement in a dove-tail slideway of a guide member 110, which in turn is secured to the base plate 45.

The mechanism for pushing the platform 94 and the relay part 27 thereon to a lower position with a pair of the wires 26 in welding position and in alignment with the welding guns 97 comprises a bell crank lever 111 (Figs. 1, 5, 7, 8, 9, and 11) fixed to a shaft 112 which is supported for rocking movement in a bearing bracket 113, which in turn is secured to the vertical plate 53. A pin 114 on one end of the bell crank lever 111 pivotally supports an arm or pusher member 115, which is stressed for oscillation about the pin by a spring 116 against a stop 117 on the bell crank lever 111. A cam follower 118 is fixed to the other end of the bell crank lever 111 and is urged into engagement with a cam 119 on a cam shaft 120 by a spring 121. The spring 121 has one end thereof connected to a stationary pin and its other end thereof connected to one end of an arm 122, the other end of which is fixed to the shaft 112 and the spring stresses the bell crank lever 111 for rotation in a clockwise direction, as viewed in Figs. 7 and 8, to cause the pusher member 115 to engage the block 30 of the relay part 27 and push the part 27 and the platform 94 to its lower position in response to the rotation of the cam 119. The lower end surface of the pusher member 115, which is arcuate and concentric with the pivot 114, is adapted to roll on the block 30 of the relay part 27 as the relay part is advanced step by step horizontally during the aligning of successive wires 26 with the welding guns 97.

The shaft 120, which is similar to the shaft 76, is journalled at one end in the vertical plate 53 and at its other end in a bearing bracket 123 (Fig. 1) mounted on a base plate 45. Fixed to the shaft 120 is a disk 124 having a series of eight rollers mounted thereon in a circle and engageable with a helical cam groove of a cam 125 mounted on the cam shaft 85. For each revolution of the main cam shaft 85, the cam 125 imparts movement to the shaft 120 through ⅛th of a revolution.

As the relay holder or platform 94 is moved to its lower position, the relay part 27 is accurately positioned thereon by a plurality of aligning pins 127 (Figs. 7, 8, 10 and 12) extending upwardly from the slide 101 and adjacent to and through apertures in the platform 94 to engage the side edges of the block 30 of the relay part 27. The block 29 of the relay part 27, as the part is moved into its lower position, is supported on a seat 133 (Figs. 1, 4, and 9 to 12) which is mounted on the slide 101. The seat 133 has a pair of relatively thin upstanding ribs 134 adapted to engage the end portions of the block 29 adjacent the ends of the ribs 32, and the seat 133 has a recess 135 for receiving the rib 33 of the block 29 to accurately position the block 29 and the wires 26 thereon. Thus, in its lower position the block 30 of the relay part 27 is supported on the platform 94 and is held against vertical displacement between the platform 94 and the pusher member 115, against lateral movement by the aligning pins 127, and against longitudinal movement by the ledge 107, and the block 29 of the relay part 27 is pressed against the supporting ribs 134 and is held against lateral displacement by the engagement of the rib 33 in the recess 135 of the seat 133, in which position of the relay part 27 the first wires 26 of the two groups of wires of the relay are in alignment with the contacts 25 in the welding guns 97.

Mechanism for imparting step-by-step movement to the slide 101 and the relay part 27 carried thereby to align successive pairs of the wires 26 with the welding guns 97 is provided which comprises a link 137 (Figs. 7, 8 and 10) pivotally connected at one end to the slide 101 and at its other end to a lever 138, which is fixed to a shaft 139. The shaft 139 is mounted in a bearing 140 on the base plate 45 and has secured thereto a lever 141 which carries a cam follower 142 engageable with a cam 143 fixed to the shaft 120. The cam 143 has six inclined and dwell surfaces designed to impart intermittent movement to the lever 141, the slide 101 and the relay part thereon for successively aligning each of the six pairs of wires 26 of the relay part 27 with the welding guns 97. The slide 101 is moved in the opposite direction in cooperation with the cam 142 by a spring 144 (Figs. 7 and 11) which encircles a rod 145 movable with the slide 101 and which reacts between a lug 146 fixed to the stationary guide member 110 and a lug 147 fixed to and depending from the slide 101.

Auxiliary guide rails 148 (Figs. 7, 8 and 10) are mounted on the slide 101 on opposite sides of the platform 94 and on opposite sides of the reduced inner end portions of the lower guide 41 to form continuations of the guide 41 to the platform 94 when the platform is in its upper position and while it is being moved horizontally.

Each of the welding guns 97 (Figs. 1, 5, 13, 14 and 18) comprises a head 150 secured to a downwardly offset end portion 154 of an elongated horizontally disposed member 155, which is connected at opposite ends thereof to the upper ends of flat leaf springs 156 and 157. The springs 156 and 157, at their lower ends are secured to blocks 158 and 159 which are fixed to the base plate 45, and the springs support the welding guns for reciprocable movement. At the rear end thereof, each of the members 155 of the welding guns 97 is provided with a laterally extending cam follower 160, which engages interior cams 161 formed on opposite sides of a disk 163, which is fixed to the main cam shaft 85. The welding guns 97 are stressed for movement to the left as viewed in Fig. 5 by the upwardly extending end portions 165 of a spring 166, which is wound around a pin 167 supported on a block 168 mounted on the base plate 45. The cams 161 are designed to control the forward and rearward movements of the welding guns 97 and to permit the rapid forward movement of the guns and the contacts 25 into engagement with the ends of the wires 26 of the relay part during the welding operation.

The welding heads 150 at their forward ends are provided with horizontal slots 167 (Fig. 18) to form a pair of fingers 168—168, which at their forward ends are notched to form a recess 169 for receiving the contacts 25 therein and which are slightly flexible to yieldably grip the contacts. As viewed from above (Fig. 14), the fingers 168 of the welding heads are of a thickness slightly less than the width of the contacts (Figs. 16 and 17). At their forward ends the fingers are provided with laterally directed guide portions 170 slidably engageable with the vertical sides of a stationary guide member 171, which is formed as a forwardly projecting upper end portion of a post 172 mounted on the base plate 45. The ends of a gage member 176 in the form of a plate which is secured in a slot in the guide member 171 extend into the slots 167 of the welding heads 150 (Fig. 16) and are shaped to provide stop surfaces 177 for engaging and accurately positioning the contacts 25 as they are fed into the recesses 169 in the welding heads 150. The ends of the gage member 176 have surfaces 178 forming stripper elements for stripping the contacts 25 from the welding heads 150 during the rearward movement of the welding guns (Fig. 14) in the event that the contacts in the guns are not welded onto the wires during the forward stroke of the welding guns. The stripper elements 178 thus insure that only a single contact is carried by each of the welding heads during each welding operation.

The contacts 25 are cut from tapes 182 (Figs. 1, 13 and 19) by a pair of cutters in the form of reciprocable punches 183 which advance the contact 25 into notches or recesses 184 of a pair of transfer members 185 (Fig. 15) which are actuated to move the contacts in opposite directions into the recesses 169 in the welding heads 150 and against the stop surfaces 177 of the gage member 176. Each of the transfer members 185 is carried by a slide 186 (Figs. 21 and 22) reciprocable in a slideway of a guide member 187 fixed to a vertical plate 188 mounted on a base plate 45. The transfer member 185 is reciprocable in a guideway 189, which extends into close proximity to the welding head 150 (Figs. 13 to 17, 21 and 22). A laterally disposed extension 190 on the slide 186 (Figs. 2, 13 and 22) has a pin 191 depending therefrom on which a block 192 is pivotally secured for receiving the bifurcated ends 193 of one end of a lever 195 pivoted for oscillating movement about a vertical pin 196 mounted on the base plate 45. A cam follower 200 on the other end of the lever 195 is engageable with a cam 201 fixed to the main cam shaft 85 and the cam 201, together in cooperation with a spring 202 (Figs. 1 and 13), imparts oscillation to the lever 195 to effect the reciprocation of the transfer member 185.

Each of the punches 183, in the form of an elongated blade-like member (Figs. 6 and 13), is mounted for sliding movement in a guideway 205 formed in a pair of cooperating die members 206, which are mounted on a supporting member 207 fixed to the base plate 45. A row of three die apertures 208 are formed in the die members 206 for the passage of the tapes 182 therethrough and the cutting edges formed by the die apertures cooperate with the cutting edges of a recess 211 formed in the forward end of the punch 183 to shear a contact 25 from the tape during the forward movement of the punch. At its other end, the punch is secured to a slide 212 reciprocable in a slideway formed in a guide member 213 mounted on the base plate 45 and in which one of the bearings 86 is formed. The slide 212 has a cam follower 214 mounted thereon which engages a cam 215 on the main cam shaft 85 for imparting reciprocation to the punch in cooperation with a spring 216, which is connected at one end to the slide member through a link 217 and at its other end is connected to a stationary pin 218 on the base plate 45.

Thus, in response to the rotation of the main cam shaft 85, the punch 183 is adapted to be reciprocated to cause the recessed portion 211 thereof to sever a contact 25 from the contact tape 182 and carry the contact 25 into engagement with the recessed portion 184 of the transfer member 185 which serves to move the contact 25 along the guideway 189 into the recess 169 of the welding head 97 (Fig. 16) which has been moved into position to receive the contact. After a contact 25 has been fed into the recess 169 and gripped by the fingers 168 of each of the welding heads 150, the cams 161 retract the welding guns 97 a slight distance (see cam chart, Fig. 23) and then advance them to press the contacts 25 against the transfer members 185 and cause the contacts to be transferred to the welding heads 150 and seated firmly in the recesses 169 therein. The transfer plungers 185 are then retracted and the cams 161 cause the welding guns 97 to advance gradually toward the ends of the wires 26 of the relay part 27 to a position indicated in dotted lines in Fig. 14, at which time the cam followers 160 of the welding guns 155 will ride off of shoulders 219 of the cams 161 to permit the springs 165 to rapidly advance the guns 97 and cause the contacts 25 to be thrust against the ends of a pair of wires 26. As the contacts 25 approach into close proximity to the ends of the wires 26, electric arcs are drawn betwen the wires 26 and the contacts 25 fusing the ends of the wires and the adjacent portions of the contacts as the contacts are driven against the wires to establish a strong welded joint therebetween.

A pair of current generating devices 220, one of which is diagrammatically indicated in Fig. 4, are provided for supplying current for the welding of the contacts 25 to the ends of the wires 26. The current generating devices may be of any conventional design, but preferably are of the electronic type employing condensers which are first charged, and then discharged by the movement of the contact against the wire 26, to supply the welding current. Each of the devices 220 is connected in series with a switch 221, and a movable contactor 222, which is adapted to engage one end of a wire 26 of the relay part 27, the circuit being completed through the contact 25, the welding gun 97 and back to the device 220 through a ground connection. The switch 221, which is normally open, is adapted to be closed for an interval during each welding cycle by a cam 224 to connect the current generating device 220 to the contact 222 preparatory to the movement of the contact 25 into engagement with the end of the wire 26. Each of the cams 224, which are mounted on the shafts 76 and 120, has six lobes thereon adapted to close the switch for a short interval for each of the six pairs of wires 26 of the relay part 27.

The two contactors 222 (Figs. 5, 8, 9 and 11) are fixed to the lower end of a pair of rods 227 supported for vertical movement by a bracket 228 fixed to the vertical plate 53. The rods 227 are insulated from the bracket 228 by bushings 229 of insulating material, and the rods are connected together at their upper ends by a block of insulating material 230. A mechanism is provided for reciprocating the rods 227 in timed relation to the intermittent advancing movement of the slide 101 and the relay part 27 thereon to establish contact with the ends of successive pairs of the wires 26, which mechanism comprises a bell crank 231, one end of which is connected to the block 230 by a pin and slot connection 232. The bell crank 231, which is pivotally supported by a bracket 233 secured to the vertical plate 53, carries a cam follower 234 engageable with the periphery of a cam 235 fixed to the shaft 75. The cam 235 has a series of six lobes, which, in cooperation with a spring 236, are adapted to actuate the bell crank lever 231 and effect the reciprocation and engagement of the pair of contactors 226 with the ends of successive pairs of wires 26 of the relay part 27 for each of the welding operations.

The contacts 25 are made from contact tapes of composite construction (Fig. 20) having a body of nickel silver 250 on which is coated a relatively thin layer of precious metal 251, such as palladium, which may be arranged in any of three patterns: either with palladium on the upper surface of the contact, with the palladium on the lower surface of the contact, or with the palladium on both the upper and the lower surfaces of the contact. Two sets of three composite contact tapes 182 made in the patterns as shown in Fig. 20, are supplied to the contact forming punch and die and are supported in grooves 255 formed in the plates 256 (Figs. 13 and 19) and aligned with the die openings 208 in the dies 206 and passageways 257 in the supporting members 207. The plates 256 are fixed to and supported between the plates 188 and plates 258 mounted on the base plate 45.

A feed mechanism for each one of the pair of punch and dies is provided for selectively feeding one of the tapes of each set of tapes from which the contacts 25 are to be sheared. Each feeding mechanism includes a pair of feed rollers 259 and 260 (Figs. 19 and 21) for each of the tapes, the lower rollers 260 being mounted on a shaft 261 journalled in the bifurcated end of an arm 262, which is pivotally supported on a pin 263 mounted in the vertical plates 188 and 258. A rod 264 extends downwardly from the arm 262 and has a spring 265 attached thereto, which stresses the arms 264 to the left as viewed in Fig. 19 for urging the rollers 260 into engagement with the rollers 259 to grip the tapes 182 therebetween. The rollers 259, which are rotatably mounted on a shaft 268 supported in the vertical plates 188 and 258, are of composite structure having a central annular groove 269, the bottom of which is formed by the outer periphery of an annular disk 270 of friction material against which the contact tape is pressed by the roller 62. On their peripheries the rollers 259 are provided with ratchet teeth 271, which are engageable by holding pawls 272 and by feed pawls 273. The holding pawls 272 are pivotally supported on the supporting members 207, and the feed pawls 273 are pivotally mounted on laterally extending arms 274 of an actuating lever 275 pivotally supported on a pin 276, which in turn is mounted in the vertical plates 188 and 258. Leaf springs 277 mounted on the actuating lever 275 urge the feed pawls 273 into engagement with the ratchet teeth 271, and springs 278 disposed in recesses in a stationary member 279 engage the lower portions of the levers 275 and stress the levers for rotation in a clockwise direction to move the upper portions thereof into the path of movement of actuating cams 281. A rod 282 extending between the plates 188 and 258 is adapted to engage the lower end of the lever 275 and limit the rocking movement thereof.

A set of three actuating cams 281 is arranged on each of a series of six cam supporting members 283 rotatably supported in a pair of disks 284—284, which are connected together by a hub 285 and secured to one of the shafts 76 and 120 for rotation therewith. The cams 281 are angularly spaced 90° one to another and are disposed axially on the members 283 in spaced relation to each other and in vertical alignment with the tapes 182 and the actuating levers 275. A knob 288 is fixed to one end of each of the cam supporting members 283 by means of which the member 283 may be turned to position one of the set of three cams 281 in operative position to engage the upper end of an actuating lever 275 and effect the feeding movement of a selected one of the tapes 182. At the opposite end thereof, each member 283 is provided with a square end portion 289, which is adapted to be engaged by a locking pawl 290 pivotally mounted on the disk 284 and yieldably retained in locking engagement with the square end 289 by a spring 291. Numerals 1, 2, and 3 (Fig. 22) or other indicia corresponding to the position of the cam 281, are engraved on the knobs 288 to indicate which one of each set of the cams is in operative position to actuate the levers 275. Thus, by setting each of the knobs 288 in the same selected position, the feed mechanism is rendered operative to feed a selected one of the tapes 182. It will be understood that the members 283 may be set to feed successively different kinds of contacts for welding onto successive ones of the wires 26 or one or more of the members 283 may be set so as to feed no contact, in which case the end of one or more of the wires 26 will have no contact welded thereto.

For each feeding movement of the tape feeding mechanism, one of the tapes 182 is advanced a distance greater than the width of the contact 25 and the end of the tape is advanced in the die apertures 208 across the guideway 205 into the path of the punch 183, and the punch 183, as it is advanced, shears the contact tape 182 along each edge of the punch to form the contact 25 and leave a waste piece of tape 292 (Fig. 14) in the die aperture 209, which waste piece is eventually forced out of the die aperture 208 into a discharge passageway 293 formed in the supporting member 207. The waste pieces 292 pass through an aperture 294 (Fig. 19) in the base plate 45 and into a suitable receptacle provided therefor.

In order to insure that not more than one tape is fed into the path of movement of the punch 183 when the apparatus is at rest and when the tapes are initially inserted in the feeding mechanism of the apparatus, mechanism is provided for stopping the machine with the punch in a partially advanced position in the path of movement of the three tapes 182. The mechanism includes a one-revolution clutch 297 (Figs. 1 and 2), one component of which is continuously driven by the sprocket and chain drive 88 and is normally engaged with another component thereof fixed to the shaft 85 for establishing a driving connection between the drive 88 and the shaft. The clutch has an actuating member engageable by a trip lever 299 for actuating the clutch to disconnect the driving engagement between the drive 88 and the shaft 85 and to stop the drive shaft 85 in a predetermined angular position, which insures that the cam 215 thereon has moved the punch 183 to an advanced position in the path of the movement of the tapes. The trip lever 299 is yieldably urged in the path of movement of and into engagement with the clutch actuating member by a spring 300 to disengage the drive and stop the shaft, and is moved to a second position by a solenoid 301 to effect the rotation of the drive shaft. The solenoid 301 is connected through a manually actuated switch into a control circuit for maintaining the solenoid energized while the apparatus is operating and to deenergize the solenoid when it is desired to stop the apparatus.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for welding contacts onto a plurality of wires of a switch part, the combination of a welding head having means for supporting a contact for movement therewith, means for feeding contacts to said welding head, a holder for supporting said switch part in a predetermined position with one of said wires in the path of movement of said welding head, means operable in timed relation to said contact feeding means for intermittently advancing said holder to align successive wires of said switch part with said welding head, means for electrically connecting said welding head and successive ones of said wires to a source of current, and means operable in timed relation to said contact feeding means for successively propelling the welding head through a predetermined path to thrust successive contacts therein against the wires aligned therewith to complete welding circuits for percussively welding the contacts onto said wires.

2. In an apparatus for welding contacts onto the ends of a plurality of straight wires disposed in a row in parallel and laterally spaced relation to each other on a switch part, the combination of a holder member for supporting said switch part in a predetermined position thereon, an electrode member having a seat in the end thereof for supporting a contact, means mounting said members in spaced relation to each other and for movement of one member relative to the other in a first direction transversely of the wires of a switch part on said holder member and for movement of one member relative to the other in a second direction parallel to said wires, means for effecting intermittent relative movement between said members in said first direction to align successive wires of said switch part with said electrode member, feed means operable in timed relation to the actuation of said member for feeding contacts individually into the seat of said electrode member, means operable in timed relation to said contact feeding means for electrically connecting said electrode member and successive ones of the wires aligned therewith to a source of current, means operable in timed relation to said contact feeding means for effecting rapid relative movement between said members in said second direction and the rapid engagement of the contacts with the wires aligned therewith for completing successive welding circuits to percussively weld the contacts onto the wires 3. In an apparatus for welding contacts onto an electrical switch part, the combination of a welding head mounted for reciprocable movement and having a recess for receiving a contact therein, a holder for supporting the switch part in a predetermined position, means for feeding contacts into the recess in said welding head, means for actuating said welding head to thrust the contact therein against said switch part, and means for ejecting said contact from said welding head on the return stroke of said head in the event that said contact is not welded to said switch part.

4. In an apparatus for welding contacts onto an electrical switch part, the combination of a welding head movable through a predetermined path and having a loading position intermediate the ends of said path, said head having a recess in one end thereof for receiving a contact and having a slot extending from said recess parallel to said path of movement, a holder for supporting the switch part in a predetermined position in the path of said head, means for feeding a contact into the recess in said welding head at said loading position, an ejecting member, means mounting said member in the slot in said head and in the rear of said loading position, and actuating means to advance said head beyond said loading position and thrust the contact against said switch part and to retract said head beyond said loading position to cause a contact in said head to be ejected therefrom by said ejecting member.

5. In an apparatus for welding contacts of various types onto ends of a plurality of wires of a switch part, the combination of a punch an die, said die having a recess for receiving the punch for reciprocable movement therein and having a plurality of apertures for guiding a plurality of different types of contact tapes into the path of movement of said punch, said apertures forming cutting edges for cooperation with said punch for shearing contacts from said tapes, said punch having a recess at one end thereof engageable with the tapes for supporting a contact sheared therefrom means for actuating said punch to shear contacts from said tapes and to carry said contacts individually to a predetermined position, means for selectively advancing said tapes into the path of said punch, and means for removing said contacts from said punch at said predetermined position.

6. An apparatus for welding contacts of various types onto the end of a plurality of wires of a switch part comprising a welding head movable back and forth in a predetermined path and having means for supporting a contact for movement therewith, a holder for supporting said switch part in a predetermined position with one of said wires in the path of movement of said welding head, means for intermittently advancing said holder to align successive wires of said switch part with said welding head, means for electrically connecting said welding head and successive ones of the wires aligned therewith to a device for supplying current thereto, means for propelling said head toward the holder to thrust the contact therein against the end of a wire aligned therewith for percussively welding the contacts onto said wires, means for severing contacts individually from a plurality of various types of contact tapes, means for feeding the severed contacts individually into the welding head, and means for selectively feeding said tapes into said severing means.

7. In an apparatus for welding contacts of various types onto the ends of a plurality of wires of a switch part, the combination of a welding head movable through a predetermined path and having a seat for supporting a contact for movement therewith, means for supporting the switch part and aligning successive wires thereof in the path of travel of said welding head, means for electrically connecting said welding head and successive ones of the wires aligned therewith to a device for supplying current thereto, means for propelling said head from a loading position toward said switch part for thrusting a contact in said head against the wire aligned therewith to complete a welding circuit to percussively weld the contact onto the wire, a punch and die, said die having a plurality of apertures for guiding a plurality of different types of contact tapes into the path of movement of said punch to shear contacts from said tapes, said punch having a recess therein engageable with the tapes for supporting a contact sheared therefrom, means for selectively advancing said tapes, means for reciprocating said punch to sever successive contacts from said tapes and to carry said contacts to a predetermined position, and means for transferring said contact from said punch to said welding head in said loading position.

8. An apparatus for welding contacts of various types onto the ends of a plurality of wires of a switch part comprising a welding head having a recess for supporting a contact therein, a holder for supporting said switch part in a predetermined position with one of said wires in the path of movement of said welding head, means for intermittently advancing said holder to align successive wires of said switch part with said welding head, means for electrically connecting said welding head and successive ones of said wires to a device for supplying welding current thereto, means for reciprocating said welding head through a predetermined path to cause the contact therein to be thrust against the end of the wire aligned therewith to complete a welding circuit for percussively welding the contact to said wire, means for severing the contacts from a plurality of various types of contact tapes, means for feeding the severed contacts into the recess in said welding head, means including an actuating lever for each of said tapes for feeding said tapes into said severing means, a carrier having a plurality of cams thereon settable to operative and inoperative positions and operable when set in said operative positions to selectively actuate said levers in response to actuation of said carrier, and means for actuating said carrier and said aforementioned means in timed relation to one another.

9. An apparatus for welding contacts onto the ends of a plurality of wires of a switch part comprising a welding head reciprocable in a horizontal path and having a seat for supporting a contact for movement therewith, a holder yieldably mounted for vertical movement from a normal upper position above said head to a lower position in alignment with said head for supporting a switch part thereon, means for feeding a switch part onto said holder in said upper position, means for moving said holder and a switch part thereon to said lower position with one of the wires of the switch part in alignment with said head, means for intermittently advancing said holder and the switch part thereon in the lower position to align successive wires with said head, means for feeding contacts individually into said welding head, means for electrically connecting the head and successive ones of the wires aligned therewith to a device for supplying current thereto, and means for actuating said welding head to thrust successive contacts carried thereby into engagement with the ends of the wires aligned therewith to complete successive welding circuits for percussively welding the contacts to said wires.

10. In an apparatus of the type described, the combination of means for severing contacts from a plurality of tapes, feed means including an actuating lever associated with each of said tapes for advancing said tapes individually into said severing means in response to the actuation of said actuating levers, and means for selectively actuating said actuating levers comprising a plurality of cam elements, a carrier supporting said cam elements in a circle about a given axis and for rotation about axes passing through said cam elements and disposed in parallel relation to said given axis, a plurality of cam lobes on each of said cam elements arranged in angularly spaced relation to each other and in axially spaced relation to each other, said cam elements being settable to selectively position the cam lobes thereon in operative position for engagement with said actuating levers, means for releasably holding said cam elements in set position, means mounting said carrier for rotation adjacent said actuating levers to effect the actuation of said levers by the cam lobes disposed in operative position, and means for rotating said carrier.

11. In an apparatus for welding contacts of various types on to the ends of a plurality of wires of a switch part, the combination of a punch and die, said die having a plurality of apertures for guiding a plurality of different types of contact tapes therethrough in the path of movement of said punch and forming cutting edges for cooperation with said punch for shearing contacts from said tapes, a pair of gripping members for each of said tapes engageable with opposite sides thereof, means including an actuating lever for imparting movement to said gripping members for advancing said tapes in response to actuation of said levers, and means for selectively actuating said levers comprising a plurality of actuating elements, each of said elements having a plurality of cam lobes thereon, a carrier for supporting said actuating elements in a circle for revolution about a common axis and for rotation about axes passing through said cam elements and disposed in parallel relation to said common axis, said cam lobes on said cam elements being arranged in spaced relation to each other angularly about the axis of said actuating elements and in spaced relation to each other axially of said actuating elements and in alignment with said actuating levers, means for releasably holding said actuating elements in angularly set positions to selectively dispose said cam lobes in operative position, said cam lobes set in operative position being effective to actuate said levers in response to rotation of said carrier, and means for rotating said carrier.

12. In an apparatus of the type described, the combination of means for severing contacts from a plurality of tapes of different types, feed means including an actuating lever associated with each of said tapes for advancing said tapes into said severing means in response to the actuation of said actuating levers, and means for selectively actuating said levers comprising a plurality of actuating elements, a carrier supporting said actuating elements in spaced relation to each other and for rotation about axes passing through said elements and disposed in parallel relation to said given axis, a plurality of cam lobes on each of said elements arranged in angularly spaced relation to each other and in axially spaced relation to each other, said elements being settable to selectively position the cam lobes thereon in operative position for engagement with said actuating levers, means for releasably holding said cam elements in said position, means mounting said carrier for movement of said elements adjacent said actuating levers to effect the actuation of said levers by the cam lobes disposed in operative position, and means for actuating said carrier.

13. In an apparatus for welding contacts of various types onto the ends of a plurality of wires of a switch part, the combination of means for severing contacts from a plurality of various types of tapes, means for guiding said tapes into said severing means, a pair of feed rolls for each of said tapes, a pawl, a ratchet and an actuating lever for each of said pairs of feed rolls, and means for selectively actuating said actuating levers comprising a carrier mounted for rotation adjacent said levers, a plurality of actuating members mounted on said carrier in a circle about the axis of rotation of said carrier, said actuating members having a plurality of pins arranged in angularly and in axially spaced relation to each other, said actuating members being settable to render the pins selectively operable or inoperable for actuating said levers to selectively feed said tapes, and means for releasably holding said actuating members in set positions.

14. In an apparatus for welding contacts onto a switch part, the combination of a reciprocable welding head having a recess in one end thereof extending transversely through said head for supporting a contact and having a slot extending from said recess to provide a yieldable portion on the head for yieldably retaining the contact therein, means for supporting a switch part in the path of movement of said head, means for reciprocating said head from a loading position for thrusting a contact carried thereby into engagement with said switch part, a die, a reciprocable punch cooperable with said die for shearing contacts from a contact tape and having a recess for supporting the sheared contact, means for actuating said punch in timed relation to the reciprocation of said welding head to shear a contact from said tape and advance said contact to a predetermined position in alignment with said welding head in its loading position, means including a reciprocable transfer member for removing the contacts from said punch at said predetermined position and yieldably advancing said contact transversely of the movement of said head into the recess therein, stop means for arresting the movement of said contact to position said contact in a predetermined position on said head, and means operable in timed relation to the reciprocation of said welding head for intermittently advancing said tape into said punch and die.

References Cited in the file of this patent

UNITED STATES PATENTS

| | | |
|---|---|---|
| 395,211 | Breul | Dec. 25, 1888 |
| 967,327 | Clark | Aug. 16, 1910 |
| 2,024,597 | Pfeiffer | Dec. 17, 1935 |
| 2,129,845 | King et al. | Sept. 13, 1938 |
| 2,197,058 | Roberts | Apr. 16, 1940 |
| 2,283,629 | Heftler | May 19, 1942 |
| 2,477,894 | Pityo et al. | Aug. 2, 1949 |